2,893,906

DIMENSIONALLY THERMOSTABLE POLYSULFIDE COMPOSITIONS CONTAINING METAL OXIDES AND METAL SULFATES AND ARTICLE COATED THEREWITH

Wallace F. Taylor, Los Angeles, Calif., assignor to Minnesota Mining & Manufacturing Company, St. Paul, Minn., a corporation of Delaware No Drawing. Application July 13, 1954
Serial No. 443,150

14 Claims. (Cl. 154—43)

This invention relates to improvements in autogenously curing, liquid polysulfide polymer compositions and to improvements in certain structures comprising the cured products thereof.

Because liquid polysulfide-type polymer compositions may be formulated to cure autogenously to a hard, tough and rubbery state after being applied in continuous films or coats, and to possess certain other properties, they have found wide acceptance in the aircraft industry as sealers for integral fuel tanks, aircraft cabins, and in structures of unusual inaccessibility, as well as where exceptional requirements, such as high resistance to oxygen, oils, hydraulic fluids, and aliphatic or aromatic liquids, are required. In addition to possessing these above properties, new aircraft designs require that sealants and coatings of this type retain their structural strength at raised temperatures and remain dimensionally stable at these raised temperatures.

Accordingly, this invention provides autogenously curing, liquid polysulfide polymer compositions, which, after curing, remain stable in dimension and plasticity, that is, do not soften, flow, swell, and lose their structural strength as their temperature is raised up to 300°–350° F., or even higher. Coatings formed from the compositions hereof retain their adhesive qualities and sealing properties at temperatures as high as approximately 350° F.

The "pot-life" of compositions made according to this invention is at least as long as, and may be substantially longer than, that of previously known liquid autogenously curing polysulfide polymer compositions. By "pot-life" is meant the period during which a liquid polysulfide polymer composition remains fluid under working conditions after it has been formulated from two pre-mixes, one comprising a polysulfide polymer and the other comprising a curing accelerator.

This outstanding thermostability in polysulfide sealant compositions is gained, in accordance with this invention, by incorporating in the composition a small quantity of a particulate anhydrous inorganic compound capable of chemically or physically combining with water, that is accepting water, and retaining accepted water at raised temperatures, i.e., those up to at least about 300–350° F. Effective inorganic compounds are the oxides of certain alkaline earth metals, i.e., calcium, strontium, and barium, as well as anhydrous inorganic salts which have the property of forming hydrates stable to temperatures over 300° F., e.g., salts such as the sulfates of calcium, zinc and cadmium. While these inorganic compounds all contain metal elements to be found in the second group of Mendelyeev's Periodic Table, it is possible that other inorganic compounds containing metal elements other than those specifically mentioned may also possess the property of taking up water and retaining water at temperatures as high as above 300° F. In addition to their affinity for water, the added particulate inorganic compounds which function to improve the dimensional thermostability of the polysulfide polymer compositions hereof remain in these compositions in a state not reactive with the polysulfide polymers in the compositions. They must not act to degrade the polymers. Thus certain inorganic compounds are totally unsuitable for imparting dimensional thermostability to polysulfide compositions. For example, hydroxides of the alkaline earth metals, oxides of zinc and magnesium as well as of the heavy metals, peroxides of these metals as well as the alkaline earth metals—all are unsuitable. They either fail to take up or fail to retain combined water at raised temperatures. Phosphorus pentoxide and sodium oxide are likewise unsuitable, inasmuch as they react with the polysulfide polymer and fail to impart any stability to the composition as a whole.

Only a small quantity of thermostability-promoting agents is required to stabilize polysulfide polymer compositions. For example, in some formulations, as low as two parts of calcium oxide per 100 parts of polysulfide polymer will give a pronounced improvement in thermostability at temperatures in excess of 300° F. On the other hand, up to 16 parts, even 22 parts, of zinc sulfate per 100 parts of polysulfide polymer are required, in some formulations of the compositions hereof, to impart dimensional thermostability to the composition. While unnecessary for dimensional thermostability, an excess of the stability promoting agents hereof will act much the same as a carbon pigment filler in the polysulfide polymer compositions and increase, to some extent, their cured tensile strength over a wide range of temperatures. However, if too much of this type of filler material is added, the adhesion of the polymeric product is reduced and for that reason, we prefer to avoid amounts in excess of approximately double the maximum amount required for thermostability purposes.

The polysulfide polymers in my compositions are those which are generally known as polyalkylene polysulfide polymers. These polymers may be formed by the reaction between sodium polysulfide and halogen-containing organic compounds such as ethylene dichloride, dichlorodiethyl formal, trichloropropane, etc. Processes such as set forth in U.S. Patent No. 2,402,977 to James C. Patrick et al., and patents referred therein may also be employed. Patent No. 2,402,977 teaches the use of both sodium polysulfide and hydrosulfide as reactants in the polymerization of organic compounds having carbon-attached substituents which are split off during polymerization. This method results in the formation of mercaptan groups simultaneously with the process of polymerization, i.e., with the formation of disulfide linkages binding alkylene organic base radicals into a polymer chain. Other methods, however, may be used in the preparation of polyalkylene polysulfide polymers which are capable of further polymerization, a characteristic which is noticeable from a study of the examples herein.

Various condensation or curing agents, and accelerators therefor, are incorporated in the liquid sealant compositions of polysulfide polymers herein described to impart to the total composition the property of autogenously hardening or curing. While formerly a lead peroxide-type cure was believed required in order to obtain cured polysulfide coatings possessing reasonable dimensional thermostability, e.g., at temperatures on the order of 200° F., and up to approximately 250° F., it is now possible to use a great variety of curing agents which, with the additives of this invention, produce tough and rubbery, dimensionally thermostable cures. Several usable condensation or curing agents are disclosed in the aforementioned patent and may be noted to comprise oxidizing agents in general, for example, percompounds such as peroxides, persalts, polysulfides, etc. Aldehydes likewise may be employed as curing agents and, in view of the reaction ensuing as a result of their use, may be classified as oxidizing agents. It will be noted that the curing or condensation agents are blended in the composition of the polymer and react with the polysulfide polymers to cure the same to a tough and rubbery state.

In the examples to follow, the oxidizing agents react with the mercaptan groups of the liquid polysulfide (i.e., polythio) compositions set forth to form water and to condense the polymers. Preferably peroxides are employed to cure these compositions. Considering the long-standing notorious dimensional instability of autogenously curing polysulfide compositions of the prior art when raised above 300° F., it is indeed surprising that the mere addition of a small quantity of inorganic compounds of the character described herein imparts to such compositions dimensional thermostability to temperatures up to at least about 300–350° F. without deleteriously affecting the otherwise outstanding properties of the composition. Instead of imparting to these compositions dimensional thermostability it would seem that the addition of the compounds herein set forth would decrease the adhesive properties of these compositions beyond the limit of usefulness. Such, however, is far from the actual facts.

I have prepared some compositions which remain dimensionally thermostable up to approximately the temperature at which the polysulfide polymer in the composition chemically degrades. This temperature for some polymers may be around 400° F. Such compositions have incorporated in them one of the oxides of the alkaline earth metals set forth above. These alkaline earth oxides chemically combine with water in the composition. Anhydrous salts which form hydrates stable to above 300° F. are excellent thermostability promoters but do not impart to the resulting compositions a stability up to temperatures at which the polyalkylene polysulfide polymer thereof begins to degrade.

Fillers, compatible organic tackifier resins, dispersing agents and other additives may be incorporated in the sealant compositions hereof, imparting to the total composition in each instance certain properties not evident from, nor directly attributable to, the individual components making up the compositions, all as will more clearly be evident from a scrutiny of the following examples, intended to be illustrative but not limitative of the invention hereof.

*Example I*

Base sealant: Parts by weight
    Liquid polysulfide polymer _____ 100
    Carbon black _____ 30
    Calcium oxide _____ 7
Curing accelerator:
    Lead peroxide _____ 7
    Dibutyl phthalate _____ 6
    Stearic acid _____ 1

The polysulfide polymer of this example was a low molecular weight polymer having reactive mercaptan terminals and side groups capable of further polymerization and cross linking. It may be prepared by the interaction of sodium polysulfide with a mixture of about 98 mole percent of dichlorodiethyl formal and about 2 mol percent of trichloropropane, to a molecular weight on the order of 4,000, with subsequent conversion of the terminal groups to mercaptan groups. Characteristically, the product has a viscosity of 450 poises. Such a polymer is readily available in commerce, under the trade name "Thiokol LP–2." Other halogen-substituted polyreactive alkylene type compounds may be substituted in varying proportions for the dichlorodiethyl formal and/or the trichloropropane hereof.

The carbon black filler in the base sealant premix acts, after blending the two premixes together and curing the composition, to increase the tensile strength thereof in the cured state. Any semi-reinforcing carbon black pigment is satisfactory for use in the compositions hereof. Titanium dioxide, barytes, and the like, may be used instead of or together with, carbon black. These fillers characteristically are inert pigment fillers.

Calcium oxide, the additive of this invention functioning to impart dimensional thermostability to the cured formulation, preferably is used in the form of a finely divided powder. Preferably, the particles size is smaller than minus 325 mesh; however, calcium oxide of any finely divided particulate size is effective to produce the result hereof.

The lead peroxide functions as a curing agent; the dibutyl phthalate as a plasticizer; and the stearic acid functions as a cure controller to inhibit excessive curing rate and prolong the "pot-life." In addition to performing these functions, however, these compounds may also be responsible for some of the exceptional properties of the cured composition.

The components of the base sealant and the curing accelerator were blended into two separate premix formulations by stirring until each appeared homogeneous. Both premixes, that is, the base sealant formulation and the curing accelerator formulation, remain in a liquid viscous state and may be shipped and stored without curing taking place in either formulation so long as they are maintained separate from each other.

For test purposes, each formulation was allowed to age for two weeks before being blended together by mixing to form a sealant composition. Without the calcium oxide in the base sealant premix, the "pot-life" of the blended composition would be expected to be approximately one hour. Surprisingly, the "pot-life" of this example was around nineteen hours in length. The liquid composition was spread in coats or films, for example, along a seam between riveted aluminum panels, and time allowed for curing to take place. It was found that the resulting seal possessed exceptional dimensional thermostability and retained its structural strength at temperatures in excess of 350° F. Without calcium oxide the cured composition softens, flows, and swells, losing its structural strength at temperatures as low as 250° F.

If desired, approximately 14 parts of strontium oxide or approximately 22 parts of anhydrous zinc sulfate, as well as other thermostability promoters, may be used in place of the calcium oxide of this example.

While the composition of this example is useful as a self-curing sealer for certain types of structures, it is found to posses inadequate adhesion to metal for superior structural characteristics when applied to smooth metal surfaces. This composition may be improved in this property by the addition of a compatible tackifier resins as illustrated by the compositions set forth in Examples 2, 3, and 4.

*Example II*

Base sealant: Parts by weight
    Liquid polysulfide polymer of Example I _____ 100
    Titanium dioxide _____ 40
Curing accelerator:
    Lead peroxide _____ 8
    Dibutyl phthalate _____ 2
    Liquid epoxy resin _____ 5
    Stearic acid _____ 1
    Calcium oxide _____ 4

In this example, the calcium oxide was compounded in a premix with the other components of the curing accelerator: the curing agent, plasticizer, resin, and cure controller.

The liquid epoxy resin employed was prepared as a condensation polymer of epichlorhydrin and bisphenol. It had an average molecular weight of 350, softened at 8–12° C., and had an epoxy value, hydroxyl value, and esterification value of 0.5, 0.1, and 1.3 respectively. The epoxy value was determined by the pyridinium chloride method and reported as epoxy equivalents per 100 grams of resin. This resin may be considered a tackifier, is compatible with the polysulfide polymer, and increases its cured adhesive properties. Improvement in adhesion was noted in this example even though only a very small amount of resin was employed.

As with Example I, the components of the base sealant were blended together separately from those of the curing accelerator. They may be stored in this separate condition. If desired, a ball mill may be used to more uniformly disperse the components of the curing accelerator.

An autogenously curing composition was formed by blending together the two premixes, i.e., stirring the two together until the mass appeared homogeneous. After being applied in a film or coat on a metal panel and allowed to cure to a tough and rubbery state, this composition exhibited an exceptional thermostability over a wide range of temperatures, including those up to in excess of 350° F.

By mixing the inorganic thermostability-promoting agent, calcium oxide, with the curing accelerator premix, rather than the premix comprising the base sealant, the "pot-life" of the formulated composition remained substantially the same as that of the composition without the additive of this invention, i.e., approximately 2 hours. It has also been found that the calcium oxide or other thermostability promoter as disclosed herein may be added separately as a third component at the time the two premixes are blended together to form the sealer composition.

*Example III*

| Base sealant: | Parts by weight |
|---|---|
| Liquid polysulfide polymer | 100 |
| Carbon black | 30 |
| Sulphur | .1 |
| Phenol aldehyde resin | 5 |
| Curing accelerator: | |
| Lead peroxide | 7 |
| Xylene | 6 |
| Stearic acid | 1 |
| Anhydrous calcium sulfate | 8 |

The liquid polysulfide polymer of this example was an alkylene-acetal polysulfide polymer very similar to the polymer of Example I, except that it was prepared as the reaction product of an alkaline polysulfide with a mixture of 99.5 mol percent of dichloroethyl formal and only 0.5 mol percent of trichloropropane. It had a lesser amount of cross linkage and exhibited greater flexibility and flow than the polymer of Example I. In commerce, this polymer is available under the name "Thiokol LP-32."

The sulphur in the base sealant premix was added as a polymerization promoter and provides a stronger cured product with high cohesive strength. It may be omitted.

The compatible tackifier phenol aldehyde resin employed in the base sealant premix was a liquid, thermosetting phenolic resin having a vescosity in the range of 20,000–40,000 centipoises. It may be prepared by the condensation of phenol with a molar excess of formaldehyde using an alkaline catalyst. Commercially, it is obtainable under the name "Bakelite BR-6741." In small amounts this resin is compatible with the polysulfide polymer and promotes the adhesion of the cured composition to smooth surfaces.

Xylene in the formulation for the curing accelerator functions as a volatile vehicle or thinner for the components thereof.

The components of the base sealant and the curing accelerator were separately mixed together into two uniform blends and, later, at the time of coating, were blended together to form the autogenously-curing, dimensionally thermostable composition of this invention.

*Example IV*

| Base sealant: | Parts by weight |
|---|---|
| Liquid polysulfide polymer of Example I | 100 |
| Calcium carbonate | 40 |
| Curing accelerator: | |
| Lead peroxide | 8 |
| Dibutyl phthalate | 4 |
| Solid epoxy resin | 5 |
| Stearic acid | 1 |
| Barium oxide | 12 |

The ingredients of the base sealant and curing accelerator were separately mixed together into two uniform blends which, when later blended together into a sealer composition, autogenously cured to a dimensionally thermo-stable, tough and rubbery, sealer.

The compatible, adhesion-promoting, solid, epoxy resin used in this composition was, like the liquid epoxy resin of Example II, a condensation polymer of epichlorhydrin and bisphenol. However, it had an average molecular weight of 900, softened at 64–76° C., and had an epoxy value, hydroxyl value, and esterification value of 0.2, 0.3, and 0.7 respectively.

Without the additive of this invention, in this case the barium oxide, this composition, when cured, failed in structural strength at approximately 250° F. With barium oxide, the structural strength of the cured composition along the seam of two aluminum panels was fully effective at 350° F.

This composition exhibited exceptional tack and adhesion to smooth surfaces, even though only a very small amount of resin was employed, as compared to the relatively poorer qualities exhibited by Example I in this respect. However, in each case, the sealant properties of the compositions remained fully effective under the effect of raised temperatures as described herein.

*Example V*

| Base sealant: | Parts by weight |
|---|---|
| Liquid polysulfide polymer of Example I | 100 |
| Calcium silicate | 4 |
| Curing accelerator: | |
| Cumene hydroperoxide | 10 |
| Calcium oxide | 5 |

The calcium silicate employed here was a precipitated, hydrated calcium silicate inert pigment filler.

The components of both the base sealant and the curing accelerator were separately mixed together into two premixes and the premixes later blended together to form a composition in accordance with the principle of this invention.

Without a thermostability promoter, the polysulfide composition of this example in a cured state has poor heat resistance. With calcium oxide as set forth in the example, the cured film remains strong and tough retaining its structural strength at temperatures in excess of 300° F.

These examples illustrate not only the unusual dimensional thermostability which may be imparted to polysulfide polymer compositions by incorporating in them certain inorganic oxides and sulfates as above noted, but likewise illustrate the unusual variety of curing agents which may now be satisfactorily employed with polysulfide polymers to give tough and rubbery coatings and films.

The coatings and films of the cured compositions hereof are effective as protective surfaces for a wide variety of materials and are particularly suitable as sealants. Panels riveted or otherwise fastened together to form enclosures are effectively sealed with a seal which withstands raised temperatures by merely applying a thin layer of the sealant hereof and allowing a curing reaction to ensue. The seal so formed retains its structural strength, i.e., does not break nor permit the penetration of fluids therethrough, as the temperature thereof is raised above 300° F. and even up to approximately 350° F.

It will be noted that the premix formulations of the compositions hereof remain in a viscous liquid state during prolonged storage but, upon being blended together, will within a relatively short period of time solidify into a tough and rubbery mass. This time or "pot-life" may vary considerably but is usually between approximately 1 and 24 hours.

I do not wish the scope of my invention to be limited except as set forth in the appended claims.

I claim:

1. A liquid polyalkylene polysulfide polymer composition capable of autogenously curing to a tough and rubbery, heat-resistant product exhibiting dimensional stability as its temperature is raised from room temperature up to at least about 300–350° F., said composition being a blend of components comprising a polyalkylene polysulfide polymer, a curing agent therefor, and a thermostability-promoting particulate inorganic anhydrous water-accepting compound selected from the group consisting of calcium oxide, strontium oxide, barium oxide, calcium sulfate, zinc sulfate and cadmium sulfate.

2. A liquid polyalkylene polysulfide polymer composition capable of autogenously curing to a tough and rubbery, heat-resistant product exhibiting dimensional stability as its temperature is raised from room temperature up to at least about 300–350° F., said composition being a blend of components comprising a polyalkylene polysulfide polymer, an oxidizing curing agent therefor, and a thermostability-promoting inorganic compound selected from the group consisting of calcium oxide, strontium oxide, barium oxide, calcium sulfate, zinc sulfate, and cadmium sulfate.

3. A liquid polyakylene polysulfide polymer composition capable of autogenously curing to a tough and rubbery, heat-resistant product exhibiting dimensional stability as its temperature is raised from room temperature up to at least about 300–350° F., said composition being a blend of components comprising a polyalkylene polysulfide polymer having reactive mercaptan groups, a mercaptan-reactive curing agent therefor, and between two and twenty-two parts of a particulate inorganic dimensional thermostabilizer per 100 parts of said polymer, said inorganic thermostabilizer being selected from the group consisting of calcium oxide, strontium oxide, barium oxide, calcium sulfate, zinc sulfate, and cadmium sulfate.

4. A liquid polyalkylene polysulfide polymer composition capable of autogenously curing to a tough and rubbery, heat-resistant product exhibiting dimensional stability as its temperature is raised from room temperature up to at least about 300–350° F., said composition being a blend of components comprising a polyalkylene polysulfide polymer having reactive mercaptan groups, a mercaptan-reactive curing agent therefor, a tensile-strength-promoting filler, and a small proportion of a thermostability-promoting inorganic compound selected from the group consisting of calcium oxide, strontium oxide, barium oxide, calcium sulfate, zinc sulfate, and cadmium sulfate.

5. An adherent liquid polyalkylene polysulfide polymer composition capable of autogenously curing to a tough and rubbery, heat-resistant product exhibiting dimensional stability as its temperature is raised from room temperature up to at least about 300–350° F., said composition being a blend of components comprising a polyalkylene polysulfide polymer having reactive mercaptan groups, a mercaptan-reactive curing agent therefor, a compatible tackifying organic resin, and a small proportion of a thermostability-promoting inorganic compound selected from the group consisting of calcium oxide, strontium oxide, barium oxide, calcium sulfate, zinc sulfate, and cadmium sulfate.

6. A liquid polyalkylene polysulfide polymer composition capable of autogenously curing to a tough and rubbery, heat-resistant product exhibiting dimensional stability as its temperature is raised from room temperature up to at least about 300–350° F., said composition being a blend of components comprising a liquid polythio polymercaptan polymer, a mercaptan-reactive curing agent therefor, and a small proportion of a thermostability-promoting inorganic compound selected from the group consisting of calcium oxide, strontium oxide, barium oxide, calcium sulfate, zinc sulfate, and cadmium sulfate.

7. An article comprising the heat-resistant, cured tough and rubbery product of claim 1.

8. An article having a surface and adherently attached thereto a coating of the heat-resistant, cured tough and rubbery product of claim 1.

9. An article comprising two metal panels fastened together along a seam and adherently attached over said seam, in a sealing position, a coating of the heat-resistant, cured, tough and rubbery product of claim 1.

10. An article comprising the heat-resistant, cured tough and rubbery product of claim 2.

11. An article having a surface and adherently attached thereto a coating of the heat-resistant, cured tough and rubbery product of claim 2.

12. An article comprising two metal panels fastened together along a seam and adherently attached over said seam, in a sealing position, a coating of the heat-resistant, cured tough and rubbery product of claim 2.

13. A liquid polyalkylene polysulfide polymer composition capable of autogenously curing to a tough and rubbery, heat-resistant product exhibiting dimensional stability as its temperature is raised from room temperature up to at least about 300–350° F., said composition being a blend of components comprising a polyalkylene polysulfide polymer, a curing agent therefor, and calcium oxide.

14. A liquid polyalkylene polysulfide polymer composition capable of autogenously curing to a tough and rubbery, heat-resistant product exhibiting dimensional stability as its temperature is raised from room temperature up to at least about 300–350° F., said composition being a blend of components comprising a polyalkylene polysulfide polymer, an oxidizing curing agent therefor, a compatible tackifying organic resin, and calcium oxide.

References Cited in the file of this patent

UNITED STATES PATENTS 2,466,963     Patrick et al.  ---------- Apr. 12, 1949

OTHER REFERENCES

Industrial and Engineering Chemistry, volume 43 (February 1951), pages 324–328, article by Jorczak et al.

Type FA, Technical Analysis of New Type of "Thiokol" Synthetic Rubber, published by Thiokol Corp., Trenton, New Jersey. Copy received by Div. 50, June 18, 1948.